(12) United States Patent
Mallah et al.

(10) Patent No.: US 10,489,469 B2
(45) Date of Patent: Nov. 26, 2019

(54) SYSTEMS AND METHODS FOR SEMANTIC KEYWORD ANALYSIS FOR PAID SEARCH

(71) Applicant: Informite Inc., Boston, MA (US)

(72) Inventors: Richard Israel Mallah, Boston, MA (US); Akos Lajos Balogh, Boston, MA (US)

(73) Assignee: MARKETMUSE, INC., Boston, MA (US)

( * ) Notice: Subject to any disclaimer, the term of this patent is extended or adjusted under 35 U.S.C. 154(b) by 1012 days.

(21) Appl. No.: 14/928,220

(22) Filed: Oct. 30, 2015

(65) Prior Publication Data

US 2016/0125462 A1   May 5, 2016

Related U.S. Application Data

(60) Provisional application No. 62/073,560, filed on Oct. 31, 2014.

(51) Int. Cl.
  *G06Q 30/00* (2012.01)
  *G06F 16/9535* (2019.01)
  (Continued)

(52) U.S. Cl.
  CPC .... *G06F 16/9535* (2019.01); *G06F 16/24575* (2019.01); *G06F 16/24578* (2019.01);
  (Continued)

(58) Field of Classification Search
  CPC ............... G06F 16/9535; G06F 16/951; G06F 16/90332; G06F 16/90324;
  (Continued)

(56) References Cited

U.S. PATENT DOCUMENTS 8,676,798 B1    3/2014  Datta et al.
10,162,882 B2*  12/2018 Franceschini ......... G06F 16/313
(Continued)

OTHER PUBLICATIONS

Combination of Unsupervised Keyphrase Extraction Algorithms. (Year: 2013).*
(Continued)

*Primary Examiner* — Maria V Vanderhorst
(74) *Attorney, Agent, or Firm* — Amin, Turocy & Watson, LLP

(57) ABSTRACT

According to various embodiments, a method for generating from one or more keywords a list of recommended keywords for using in paid search advertising includes identifying, via a tool, one or more keywords to be used in a paid search advertising campaign at an identified website. The method may further include acquiring, by a crawler, content from a plurality of different web content sources via one or more networks. The method may also include applying, by the tool, to the acquired content an ensemble of one or more key phrase extraction algorithms, one or more graph analyses algorithms and one or more natural language processing algorithms to identify a set of semantically relevant keywords ranked by a relevance score. The method may further include generating, by the tool from the set of semantically relevant keywords, a knowledge graph of recommended keywords to replace or supplement the one of more keywords. The method may further include outputting, by the tool based at least partially on the knowledge graph, an enumerated list of recommended keywords to one of replace or supplement the one or more keywords to be used for the paid search advertising campaign at the identified website.

20 Claims, 10 Drawing Sheets

(51) Int. Cl.
  *G06Q 30/02* (2012.01)
  *G06F 16/28* (2019.01)
  *G06F 16/2457* (2019.01)
  *G06F 16/9032* (2019.01)
  *G06F 16/951* (2019.01)
  *G05B 19/418* (2006.01)

(52) U.S. Cl.
  CPC ...... *G06F 16/285* (2019.01); *G06F 16/90324* (2019.01); *G06F 16/90332* (2019.01); *G06F 16/951* (2019.01); *G06Q 30/0256* (2013.01)

(58) Field of Classification Search
  CPC ............. G06F 16/24578; G06F 16/285; G06F 16/24575; G06Q 30/0256
  See application file for complete search history.

(56) References Cited

U.S. PATENT DOCUMENTS

| | | |
|---|---|---|
| 2002/0129014 A1 | 9/2002 | Kim et al. |
| 2007/0174340 A1 | 7/2007 | Gross |
| 2010/0030648 A1 | 2/2010 | Manolescu et al. |
| 2011/0213655 A1* | 9/2011 | Henkin ................. G06Q 30/00 705/14.49 |
| 2011/0288931 A1 | 11/2011 | Kuhn et al. |
| 2012/0226713 A1 | 9/2012 | Park et al. |
| 2018/0366013 A1* | 12/2018 | Arvindam ................ G09B 5/06 |

OTHER PUBLICATIONS

Ensemble learning for keyword extraction from event descriptions (Year: 2014).*
International Search Report and Written Opinion of the International Searching Authority for International Application No. PCT/US2015/058289 dated Feb. 2, 2016.
International Search Report and Written Opinion of the International Searching Authority on PCT/US2015/058285 dated Feb. 1, 2016.
Final Office Action on U.S. Appl. No. 14/928,210 dated Oct. 25, 2018.
International Preliminary Report on Patentability for PCT/US2015/058289 dated May 11, 2017.
Notice of Allowance on U.S. Appl. No. 14/928,210 dated May 1, 2019.
U.S. Office Action on U.S. Appl. No. 14/928,210 dated May 3, 2018.
Kim, et al. "Retrieving and Ranking Methods for Finding Match Candidates". 2011 International Conference on Complex, Intelligent, and Software Intensive Systems. 5 pages.
Notice of Allowance dated May 1, 2019 for U.S. Appl. No. 14/928,210, 34 pages.

* cited by examiner

Fig. 2D

SYSTEMS AND METHODS FOR SEMANTIC KEYWORD ANALYSIS FOR PAID SEARCH

CROSS-REFERENCES TO RELATED APPLICATIONS

The present application claims priority to and the benefit of U.S. Provisional Application No. 62/073,560, titled "Systems And Methods For Semantic Keyword Analysis For Organic Search" and filed on Oct. 31, 2014, which is incorporated by reference herein in its entirety for all purposes.

FIELD OF THE DISCLOSURE

This disclosure generally relates to systems and methods for keyword research and analysis, and in particular, to keyword research and analysis with respect to paid search optimization.

BACKGROUND OF THE DISCLOSURE

In efforts to increase advertising visibility and traffic to web pages (e.g., blogs, news sites, shopping sites, etc.) associated with the advertising, owners of web pages may engage in search engine optimization (SEO) corresponding to paid searches. Search engine optimization entails considerations of how search engines work, what people search for, how people search (e.g., what terms people use to search for various topics), and the like. In addition, owners of web pages may also attempt to optimize the effectiveness of targeting advertisements towards users of social media (e.g., optimizing targeting based on keywords used by users of social media). As an example of one method of optimization of paid searches, owners of websites may attempt to manually research keywords typically related to topics of their websites, and attempt to utilize these manually researched keywords in their targeted internet advertising. However, such methods may be cumbersome, time-consuming, and provide minimal beneficial effect for web visibility.

BRIEF SUMMARY OF THE DISCLOSURE

The present solution provides a new tool for keyword research and analysis for optimization of paid searches. Various embodiments of the tool provide an efficient and user-friendly mechanism for identifying recommended keywords that may replace or supplement existing keywords associated with a user's paid searches.

According to various embodiments, a method for generating from one or more keywords a list of recommended keywords for using in paid search advertising includes identifying, via a tool, one or more keywords to be used in a paid search advertising campaign at an identified website. The method may further include acquiring, by a crawler, content from a plurality of different web content sources via one or more networks. The method may also include applying, by the tool, to the acquired content an ensemble of one or more key phrase extraction algorithms, one or more graph analyses algorithms and one or more natural language processing algorithms to identify a set of semantically relevant keywords ranked by a relevance score. The method may further include generating, by the tool from the set of semantically relevant keywords, a knowledge graph of recommended keywords to replace or supplement the one of more keywords. The method may further include outputting, by the tool based at least partially on the knowledge graph, an enumerated list of recommended keywords to one of replace or supplement the one or more keywords to be used for the paid search advertising campaign at the identified website.

In some embodiments, the method further includes receiving, by the tool, the one or more keywords from the identified website.

In some embodiments, the method further includes acquiring, by the crawler, content from the identified website.

In some embodiments, the method further includes applying, by the tool, the ensemble to the content from the identified website.

In some embodiments, the method further includes acquiring content, by a crawler, from the plurality of different web content sources including web sites, news articles, blog posts and keyword data.

In some embodiments, the one or more key phrase extraction algorithms includes a Bayesian statistical ensemble.

In some embodiments, the method further includes outputting, by the tool, the enumerated list of recommend keywords ranked by at least one of an attractiveness score, a volume score and a competition score.

In some embodiments, the method further includes outputting, by the tool, the enumerated list of recommend keywords ranked by at least one of a relevance score.

In some embodiments, the method further includes outputting, by the tool, the enumerated list of recommend keywords ranked by a cost-per-click value.

In some embodiments, the one or more key phrase extraction algorithms include a Bayesian statistical ensemble and the ensemble performs a plurality of term ranking functions are performed including one or more of a core phrase term ranking function, a tail phrase term ranking function, a hyperdictionary graph traversal algorithm and/or a semantic knowledgebase path traversal score.

According to various embodiments, a system for generating from one or more keywords a list of recommended keywords for using in paid search advertising includes a tool configured to execute on a processor to receive an input of one or more keywords for which to generate a list of recommended keywords to use via paid search advertising at an identified website and one or more targeting attributes for targeting the paid search advertising at the identified website. The system may further include a crawler configured to acquire content from the identified website based at least in part on the one or more target attributes. The tool may be configured to apply to the acquired content an ensemble of one or more key phrase extraction algorithms, one or more graph analyses algorithms and one or more natural language processing algorithms to identify a set of semantically relevant keywords ranked by a relevance score. The tool may be configured to generate from the set of semantically relevant keywords, a knowledge graph of recommended keywords to replace or supplement the one of more keywords. The tool may further be configured to output, based at least partially on the knowledge graph, an enumerated list of recommended keywords to one of replace or supplement the one or more keywords to be used for the paid search advertising campaign at the identified website.

In some embodiments, the tool is further configured to receive the one or more keywords from the identified website.

In some embodiments, the crawler is further configured to acquire content from the identified website.

In some embodiments, the tool is further configured to apply the ensemble to the content from the identified website.

In some embodiments, the crawler is further configured to acquire from the plurality of different web content sources including web sites, news articles, blog posts and keyword data.

In some embodiments, the one or more key phrase extraction algorithms includes a Bayesian statistical ensemble.

In some embodiments, the tool is further configured to output the enumerated list of recommend keywords ranked by at least one of an attractiveness score, a volume score and a competition score.

In some embodiments, the tool is further configured to output the enumerated list of recommend keywords ranked by at least one of a relevance score.

In some embodiments, the tool is further configured to output the enumerated list of recommend keywords ranked by a cost-per-click value.

In some embodiments, the ensemble is further configured to perform a plurality of term ranking functions including one or more of a core phrase term ranking function, a tail phrase term ranking function, a hyperdictionary graph traversal algorithm and/or a semantic knowledgebase path traversal score.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 2D is another embodiment of a screen shot of the tool page;

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for a keyword research and analysis tool.

Section C describes embodiments of systems and methods for a crawler.

Section D describes embodiments of a storage medium including an ensemble of algorithms.

Section E describes embodiments of systems and methods for a tool.

A. Computing and Network Environment

Figure 1A:
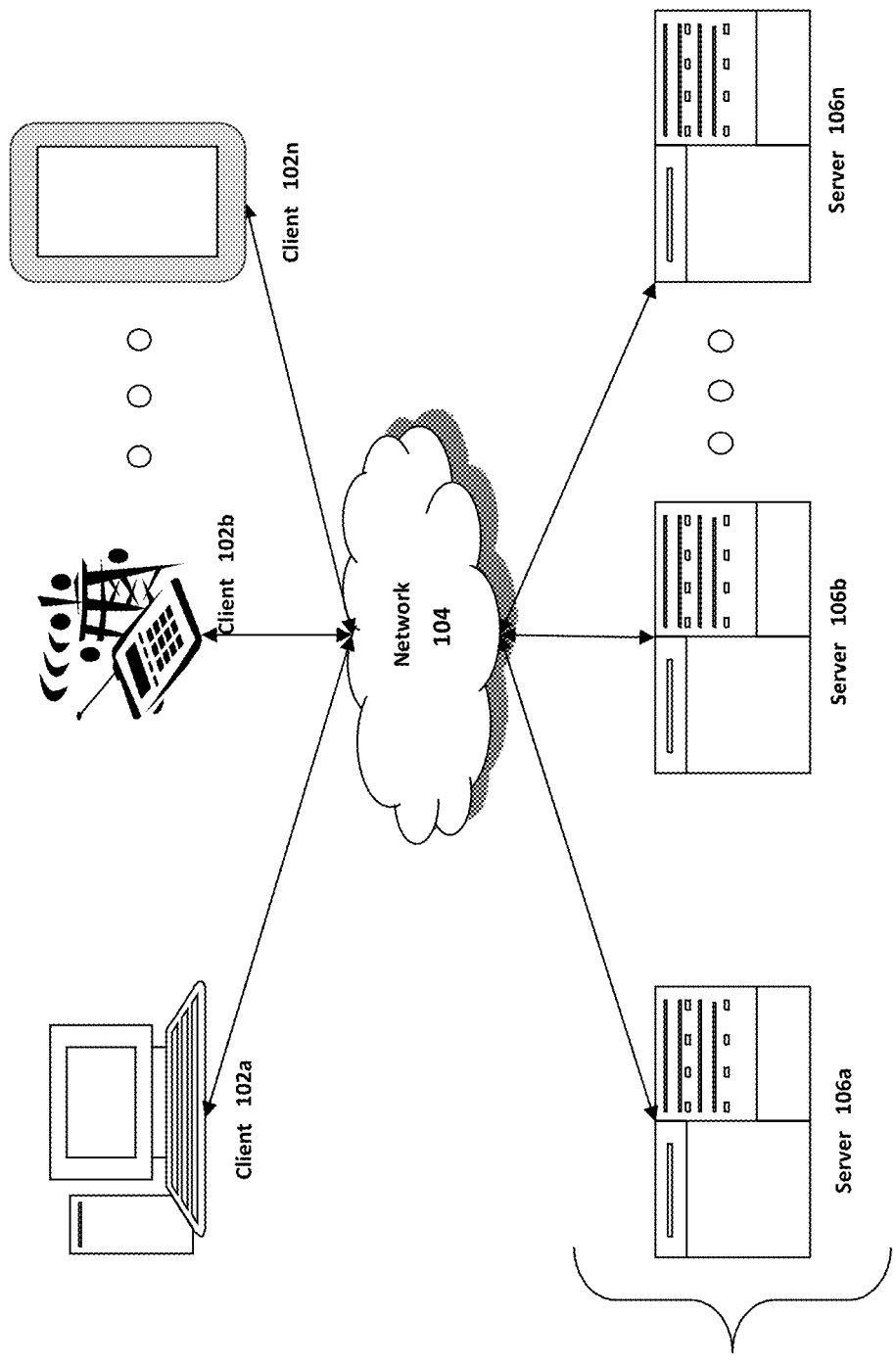
FIG. 1A is a block diagram depicting an embodiment of a network environment comprising client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
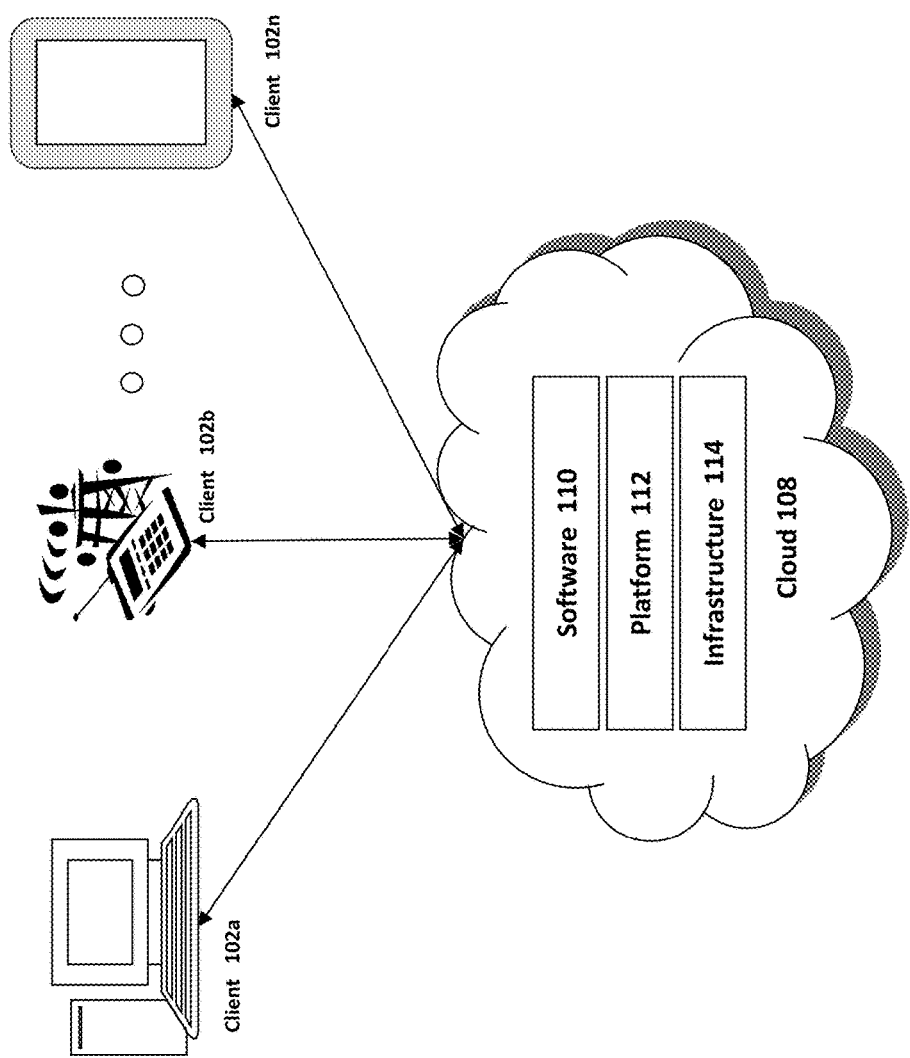
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
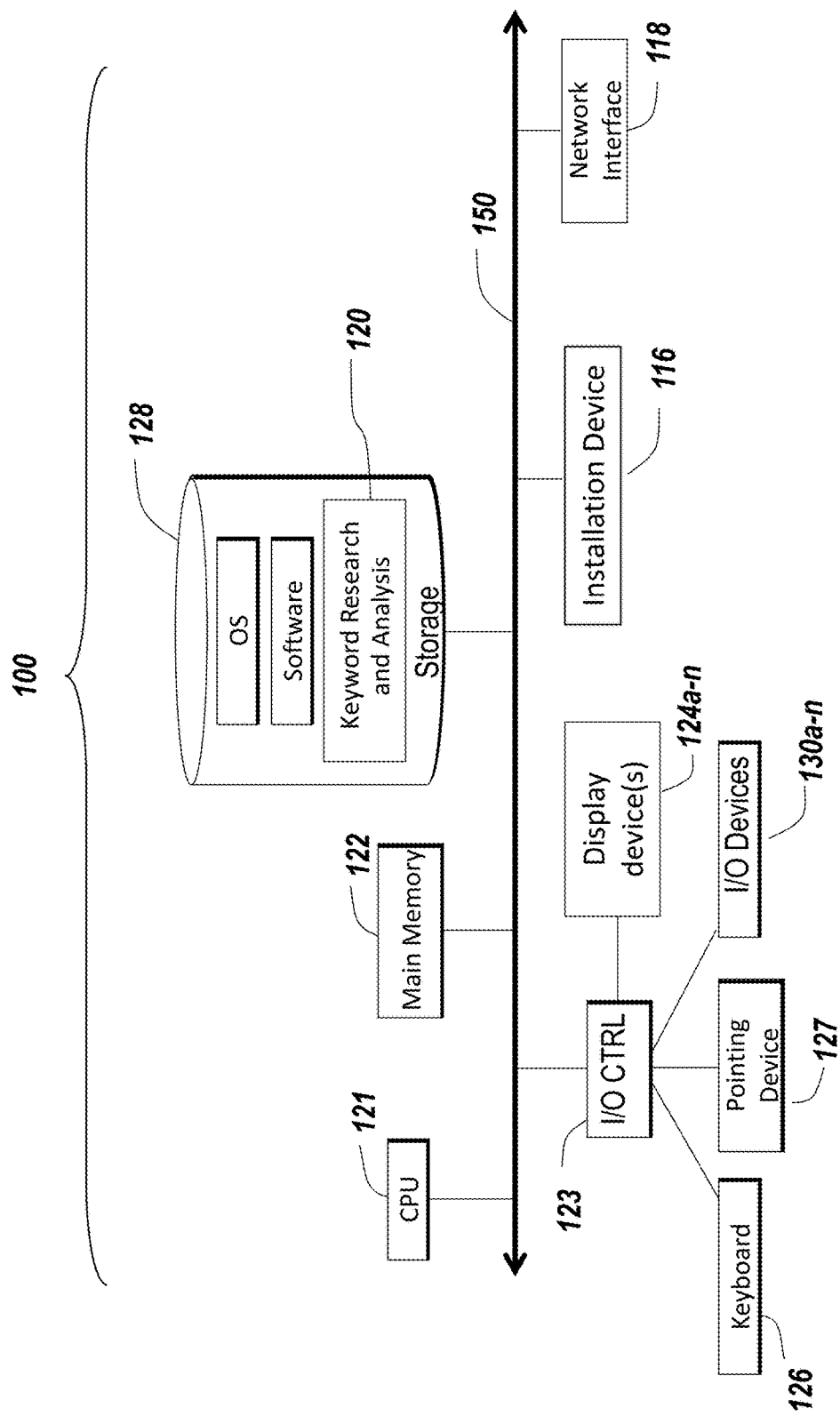
FIGS. 1C and 1D are block diagrams depicting embodiments of computing devices useful in connection with the methods and systems described herein.
Figure 1D:
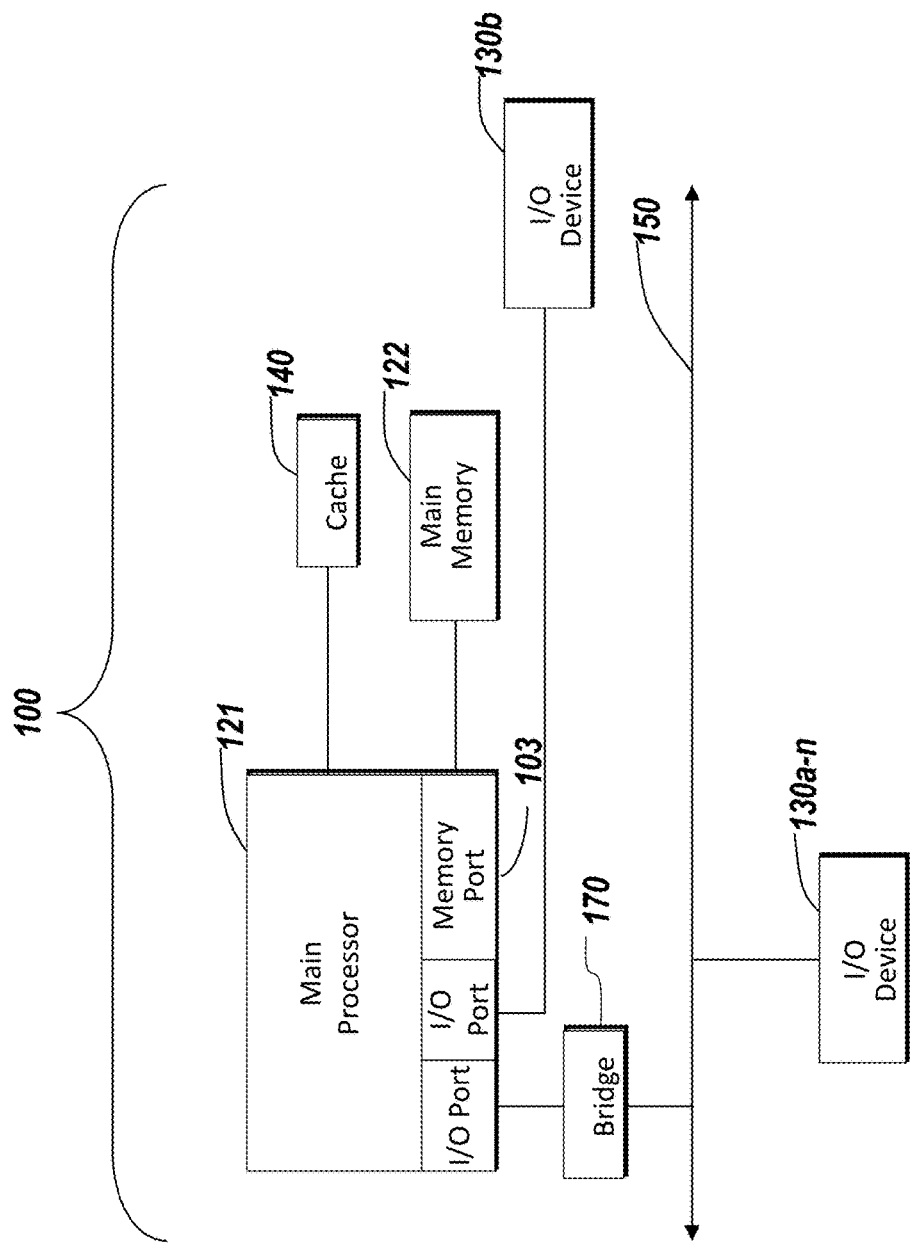

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a tool for keyword research and analysis 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120 for the experiment tracker system. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as a installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is a eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Keyword Research and Analysis Tool

Systems and methods of the present solution are directed to performing keyword research and analysis to generate a list of topically-related and conceptually related keywords to a specific topic, for example, for purposes of search engine optimization (SEO) for paid searches.

One aspect of the present disclosure is directed to systems and methods for performing a keyword search to generate a list of topically-related and conceptually related keywords for use in a marketing or advertising campaign of a website. In some embodiments, a keyword tool can perform semantic keyword research and recommendations. In one aspect of the present disclosure, there is provided a system and method for performing semantic keyword research (e.g., semantic SEO keyword research), which may quickly and efficiently generate a list of topically-related recommended keywords. Unlike the traditional keyword planner and research tools, a tool may generate keywords that are conceptually related to the topic that a user is marketing. For example, for the term "dog food," the tool can generate recommended keywords such as "pet food" and "doggy treats." The keywords suggestions may be ranked by relevance scores, a measure of topical relevance, saving a user from hours of manual keyword research effort. In some embodiments, traditional applications include keyword research for prospecting and new clients, identifying new keywords for existing clients, and identifying relevant head terms for semantic SEO applications. In some embodiments, the systems and methods described herein can be used alongside a long-tail keyword tool (e.g., Google Keyword Planner) to identify new long-tail opportunities. Search engine marketing campaigns can be optimized with semantic machine learning.

In another aspect, the present disclosure is directed to system and methods for performing social advertising research. The keyword tool can identify high-value keyword buys on various social media sites such as Facebook, Twitter, LinkedIn, and other social media advertising. Unlike existing keyword research tools, the present keyword tool can generate suggestions that are topically-related, allowing advertisers to quickly identify the most relevant and best-performing terms to be used, for example, for Facebook Interest Group targeting, Twitter keyword/hashtag targeting, and any other display advertising system that utilizes keyword-based targeting.

Accordingly, aspects of the present disclosure are directed to a keyword tool that can generate a list of topically-related and conceptually related keywords for use in user-targeted marketing and advertising. In some embodiments, the keyword tool may be used to build keyword strategy for advertising. For example, the keyword search tool can generate a target keyword list with respect to paid searches and targeted advertising or identify keyword candidates.

Figure 2A:
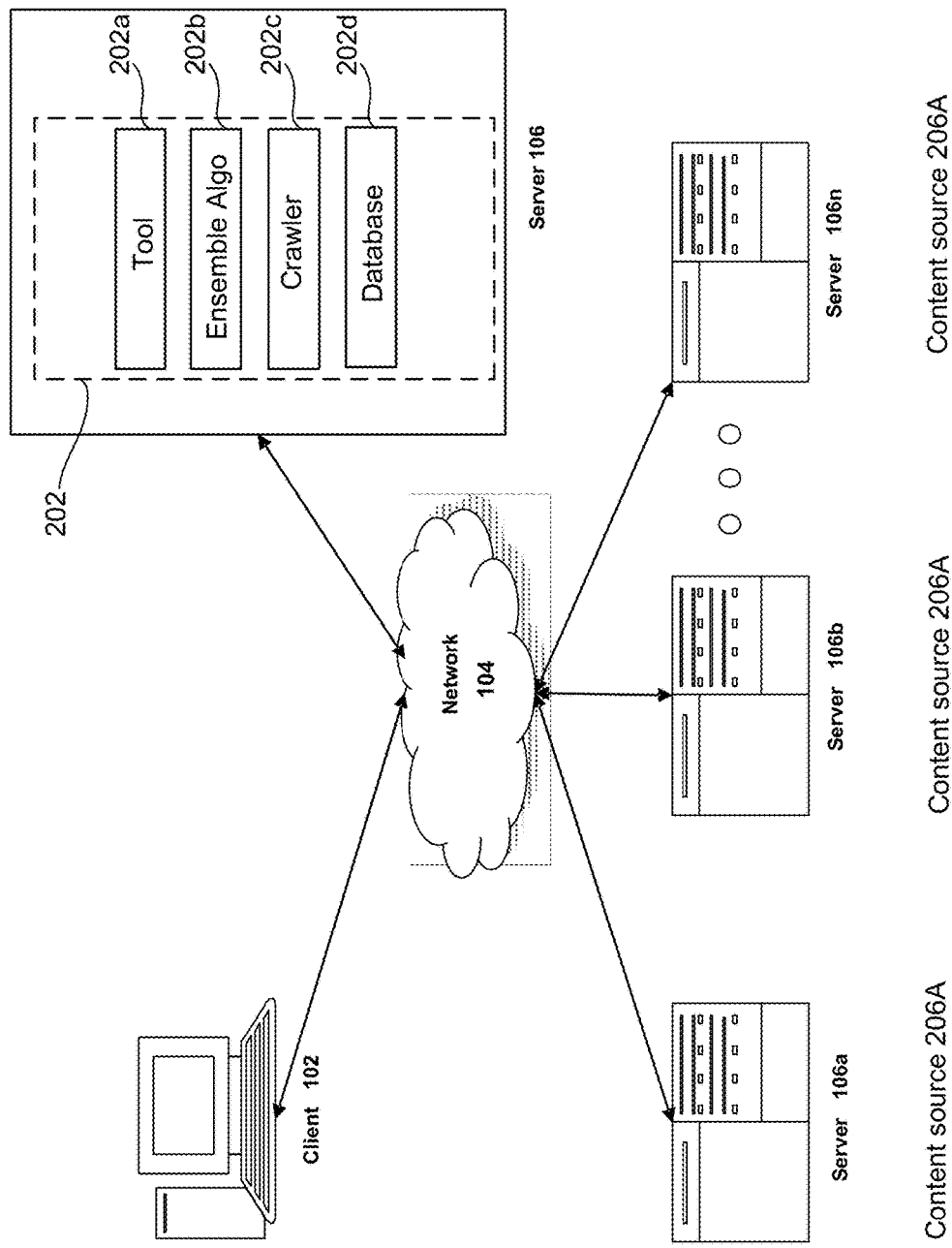
FIG. 2A is an embodiment of a system comprising a keyword research and analysis tool.

Referring to FIG. 2A, an embodiment of a computer environment similar to that illustrated in FIG. 1A is depicted. In addition to the elements previously described in connection with FIG. 1A, a server 106 including a keyword research and analysis tool ("keyword tool") 202 may also be connected to the network 104. Accordingly, the keyword tool 202 may be connected to the client(s) 102a-102n and the server(s) 106a-106n via the network 104. In addition, the server(s) 106a-106n may each be a content source 206A for providing content for research and analysis by the keyword tool 202. In various embodiments, the content may include data corresponding to websites, news articles, blog posts, social networking sites, keyword data, and/or any other suitable information for use with the keyword tool 202.

In the embodiment shown in FIG. 2A, the keyword tool 202 may include one or more components or modules for performing various functions corresponding to keyword research and analysis. In the embodiment of FIG. 2A, the keyword tool 202 includes a tool 202a, an ensemble of algorithms 202b, a crawler 202c, and a database 202d. Each of these components are described in further detail below. In other embodiments, the keyword tool 202 may include less or more components, depending on the desired functions to be implemented by the keyword tool 202. For example, one embodiment of the keyword tool 202 may include the tool 202a and the ensemble of algorithms 202b only.

C. Crawler

According to various embodiments, the crawler 202c may be a tool for parsing and collecting relevant content over the web. In some embodiments, each of the other tools at the keyword tool 202, such as, but not limited to, the tool 202a may be connected to the crawler 202c and may operate in conjunction with the crawler 202c. In other words, the other tools of the keyword tool 202 may receive the content acquired by the crawler 202c and perform various operations on the content.

In some embodiments, the crawler 202c at the keyword tool 202 may use one or more keywords to search the web for a plurality of different relevant web content sources. For example, the crawler 202c may acquire content by crawling and searching the web for the one or more keywords and any content related to the keywords. In various embodiments, the crawler 202c may be configured to acquire content from a variety of media, such as, but not limited to, websites, news articles, blog posts, keyword data (e.g., stored in the database 202d of the keyword tool 202), internet forums, social networking sites, advertising sites, and/or the like. The content to be acquired by the crawler 202c may be located at servers 106a-106n. The keyword tool 202 (e.g., the crawler 202c) may analyze the acquired content to build a collection of sources (e.g., articles, blogs, social media, etc.) related to the input keywords. In some embodiments, the crawler 202c may be configured to perform advanced semantic processing, such as, but not limited to, stemming and lemmatization.

In some embodiments, the database 202d may include data acquired from one or more other sources (e.g., data acquired by the crawler 202c). In some embodiments, the database 202d may include keyword data acquired or obtained from a search engine. In some embodiments, the database 202d may include keyword data acquired or obtained from a web site. In some embodiments, the database 202d may include keyword data acquired or obtained from a social networking site. In some embodiments, the database 202d may include keyword data acquired or obtained from a third party that aggregates data and provides data for use or purchase. Any of the systems and methods described herein, such as any of the algorithms may use the data in the database 202d for any of the computations described herein, such as keyword recommendations.

According to some embodiments, the crawler 202c may execute any suitable search software for crawling a given website. In particular embodiments, the crawler 202c may be configured to crawl the web by jumping from webpage to webpage. In other embodiments, the crawler 202c may be configured to capture all pages on a single website, as opposed to jumping from webpage to webpage. In such embodiments where the crawler 202e is capable of capturing all pages on a single website, the crawler 202c may have particularly configured parameters, such as, but not limited to, which directories to exclude, which special directories to include, directories and/or pages that the crawler 202c should merely visit but not index, and special customizations in terms of what pattern of pages to include or exclude. In other words, the crawler 202c may be configured to exclude certain elements of a website, while including certain other elements of the website.

In further embodiments, the crawler 202c may be configured to execute crawls so as not to weigh down or hinder servers. In particular embodiments, the crawler 202c may be configured to be limited in the number of webpages it fetches during a predetermined amount of time. As a non-limiting example, the crawler 202c may be configured to fetch no more than five pages per second. In additional embodiments, the crawler 202c may be configured to call the header of a page (e.g., HTTP HEAD request) before fetching the body of the page to retrieve information about the page to determine if the page contains content that should be downloaded or not. In yet further embodiments, the crawler 202c may be configured to monitor a response time of a server. In other words, the crawler 202c may monitor how long it takes a server to send a response to a request, and if the response time drops below a predetermined threshold (e.g., five seconds), the crawler 202c may be configured to stand by for a predetermined amount of time (e.g., 20 seconds) before resuming crawling. In still further embodiments, after waiting for the predetermined amount of time, the crawler 202c may resume crawling at a slightly more cautious pace than previously exhibited. As a non-limiting example, the crawler 202c may crawl at a rate of four pages per second, as opposed to a previous rate of five pages per second. According to various embodiments, once the crawler 202c has retrieved sources relevant to the focus keywords, the crawler 202c may be configured to interact with any suitable indexing technology, such as, but not limited to, an open source software (e.g., Solr) for indexing of the content acquired by the crawler 202c. In such embodiments, the indexing technology for use with the crawler 202c may be configured to capture necessary fields, clean data, and/or perform statistical analyses on the acquired content.

D. Ensemble of Algorithms

According to various embodiments, the ensemble of algorithms 202b may be a storage medium for storing a plurality of algorithms to be accessed by each of the other tools at the keyword tool 202, such as, but not limited to, the tool 202a, which may be connected to the ensemble of algorithms 202b and which may operate in conjunction with the ensemble of algorithms 202b. In other words, the other tools of the keyword tool 202 may access the ensemble of algorithms 202b and perform operations based on the instructions stored at the ensemble of algorithms 202b.

In some embodiments, the ensemble of algorithms 202b takes as input a set or corpus of pseudo-relevant documents, such as content acquired by the crawler 202c and provides an output of a set of related keyphrases or keywords (e.g., a set of semantic-relevance-scored related keyphrases or keywords). Accordingly, in various embodiments, in generating a set of semantically relevant topics scored or ranked by relevance, a tool may be configured to receive data corresponding to a corpus of pseudo-relevant documents (e.g., acquired by the crawler 202c), and may be instructed by the ensemble of algorithms 202d to cleanse and normalize the received documents and information. In some embodiments, the crawler 202c may be configured to lemmatize the documents as well. In some embodiments, the ensemble of algorithms 202b may instruct all descriptive phrase n-grams in the corpus up to some length to be identified. In some embodiments, the length of the n-grams may be predetermined by a user or administrator. Thresh-holding may then be performed using some function of frequency and available memory. Next, in some embodiments, phrases starting or ending with conjunctives or other stop words may be discarded. In some embodiments, the method includes building term frequency and inverse document frequency matrices to act as a shared resource for subsequent phrases. The most frequent morphological phrase forms may be re-allocated based upon a weight value assigned to the phrase. In some embodiments, a lemmatization-equivalent of unigrams or phrases may be used to group. In further embodiments, the method includes estimating the bayesian prior of phrases. This may be done optionally as an adjunct to the term frequency matrix. In an embodiment, a linear combination of rarity-ranked bayesian priors of the constituent unigrams of the phrase is used.

In some embodiments, the ensemble of algorithms 202b includes instructions for applying an ensemble of a plurality of different classes of algorithms such as four constituent classes of algorithm. For example, term-ranking functions (TRFs) may be performed based on analysis of phrase distribution in corpus and the estimated phrase priors. First, a core phrase TRF may be performed (e.g., Robertson selection value and Kullback-Leibler distance). Second, a tail phrase TRF may be performed (e.g., Rocchio's weights, chi-square, and binary independence model). Third, a hyper-dictionary graph traversal algorithm may be performed (e.g. TextRank). Fourth, a semantic knowledgebases path traversal score based on terseness of semantic path and some curated predicate weights may be generated (e.g., using ConceptNet or Yago knowledgebases). Each constituent class of algorithm may itself be an ensemble of algorithms under that class, such that the ensemble of algorithms comprises a plurality of ensembles.

In some embodiments, the ensemble method may be a weighted combination of the sets of scored phrases from each of the above constituents (e.g. a linear combination, or a linear combination of some normalization of the constituents). The weights may be tuned by how tail-oriented the desired output is (e.g. where tail TRFs' output are weighed more heavily if more tail-like concepts are desired). In other embodiments, the weights may be tuned by how much n-grams of various n are desired (e.g. by multiplication by a function on desired lengths and phrase length under consideration). In some embodiments, unigrams with high bayesian priors are then reduced in the distribution's weights by some function of the unigram's prior. As such, the output of this method may be a set of semantic-relevance-scored phrases.

Although, generally, at times, the word keyword may be used to described one or more keywords to be used by the systems and methods, key phrases may be used interchangeably with keywords. In some embodiments, a key phrase of one phrase is a keyword. In some embodiments, a keyword is a single phrase is a key phrase. As such, in some embodiments, a plurality of keywords is a key phrase.

E. Tool

Figure 2B:
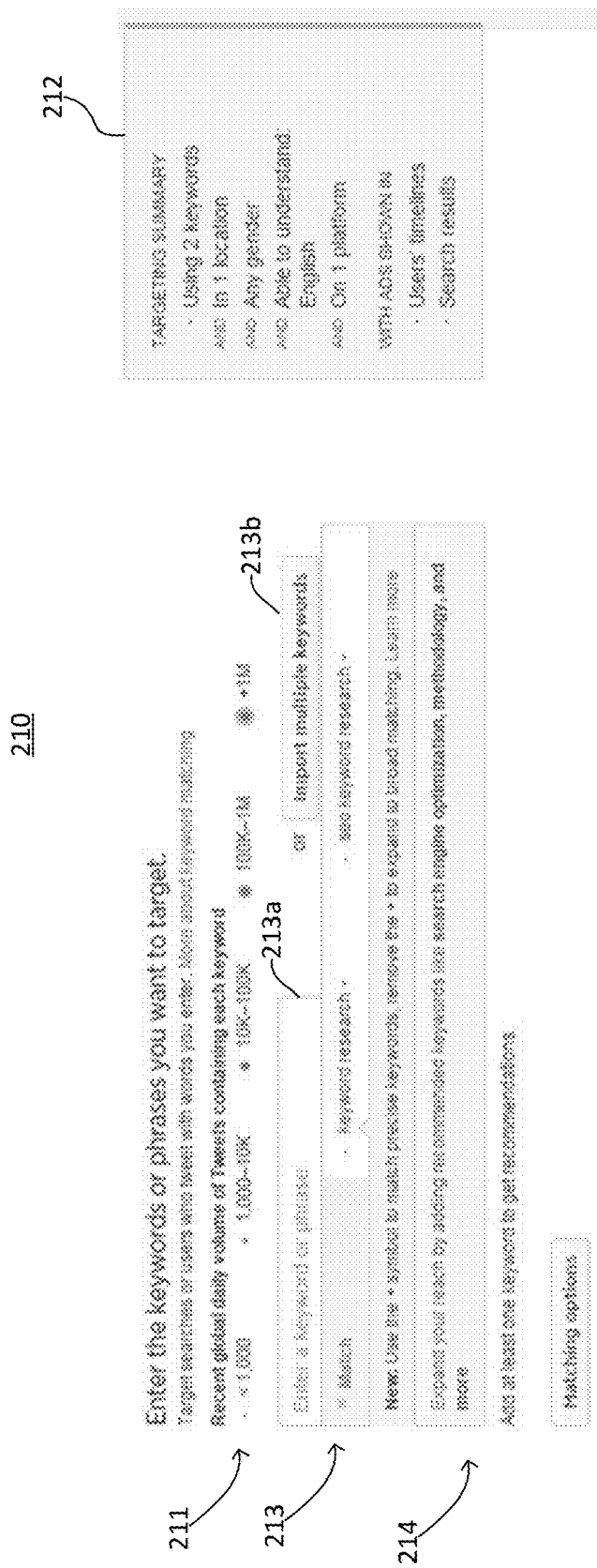
FIG. 2B is an embodiment of a screen shot of a tool page.

Referring to FIG. 2B, illustrated is an embodiment of a screen shot of a topic tool page. In various embodiments, the screen shot may represent a keyword user interface (UI) 210 to be presented to a user at the client device 102 for selecting parameters for a keyword search. In the embodiments shown in FIG. 2B, the UI 210 and the keyword tool 202 are compatible for use with Twitter. In other embodiments, the UI 210 and the keyword tool 202 may be compatible for use with one or more other social media websites, such as, but not limited to, Facebook, Instagram, MySpace, and the like. After a user populates entries into the keyword UI 210 and submits the entries, the tool 202a may receive the entered information via the network 104 to perform one or more operations with respect to the user entries. The functions of the tool 202a are discussed further below.

According to the embodiment shown in FIG. 2B, the keyword UI 210 may include an input portion including an input field 213 having a keyword field 213a for receiving and entering one or more user-entered keywords and an import field 213b for importing keywords into the UI 210. The one or more keywords may be a keyword, topic, or phrase that a user wishes to have analyzed by the tool 202a. In some embodiments, a user may enter a keyword or phrase via the keyword field 213a or may import multiple keywords via the import field 213b. In embodiments where a user chooses to import multiple keywords, a user may select a file (e.g., a file locally stored on the client 102) via the UI 210 and upload the file to the UI 210. In such embodiments, the UI 210 (e.g., via the tool 202a) may read the file and populate one or more keywords into the keyword field 213a in accordance with the uploaded file. In the embodiment shown in FIG. 2B, the keywords that a user entered or imported via the input field 213 is displayed directly below the keyword field 213a and the import field 213b. In some embodiments, the UI 210 may include a parameters display 212 for indicating the parameters of the operation. The parameters of the operation provide the rules by which the analysis of the one or more keywords will abide, and a summary of these parameters may be displayed at 212. In some embodiments, parameters may include, but not be limited to, geographic locations, gender of social media users, language of the users, social media website(s) to be searched, type of advertisements shown to the social media users, level of activity of the users, and/or the like.

In addition, the keyword UI 210 may also include an output portion including an activity indicator 211 and a suggestions box 214. The activity indicator 211 may display a volume of activity associated with the entered keywords. For example, the activity indicator 211 may indicate a recent global daily volume of instances of social media user activity (e.g., tweets on Twitter) containing each keyword. The suggestions box 214 may indicate recommended keywords, based on the input keywords, that a user may wish to add to a targeted advertising campaign to reach more quality customers. The suggestions box 214 may display a preview of the recommended keywords, and may have the option of expanding the list so that a user may review the full list of recommended keywords.

In other embodiments, the keyword UI 210 may include any suitable variation of the layout illustrated in FIG. 2B, or even different layouts. In alternative embodiments, the user input interface may take on other suitable formats, for example, but not limited to, a list for user selection and/or the like. In some embodiments, the keyword field 213 may auto-populate the one or more keywords as a user types into the keyword field 213. In further embodiments, a list of keywords may be stored in the database 202d, for example, to auto-populate the one or more keywords. In additional embodiments, the keyword recommendations may be displayed in other suitable formats, for example, but not limited to, a chart, a graph, etc., or combinations thereof.

After entering the one or more keywords, setting the parameters for the keyword research and analysis, and submitting the entries, the tool 202a may identify keywords that are relevant to the entered one or more keywords for purposes of targeted advertising or marketing, including paid searches. By way of example, according to the embodiment shown in FIG. 2A, a user of keyword UI 210 may enter into the keyword field 211 "keyword research" and "seo keyword research." The user may wish to find recommended keywords for supplementing or replacing the input keywords for paid searches. Accordingly, the tool 202a, after undergoing its operations with respect to the input keywords, may output a list in the form of suggestions box 212 of recommended keywords for use in paid searches. In the present embodiment, the recommended keywords include "search engine optimization" and "methodology," which are related to the input keywords. Accordingly, a user may review and interpret the information embodied in suggestions box 214 and may identify further keywords from the recommended keywords to target for paid searches to increase traffic to the user's website via the paid searches.

After the fields of the UI 210 are populated and submitted by a user, the entered information may be transmitted to the keyword research and analysis tool 202 via the network 104, at which one or more operations may be performed corresponding to the entered keywords.

According to various embodiments, the submitted keywords are received by the crawler 202c. The crawler 202c may then acquire content from various web sources to build a corpus of collected content that is relevant to the input keywords. For example, the crawler 202c may parse Twitter, or any other social networking site, to search for relevant terms or hash tags used by the users of the social media sites. Further details regarding the operation of the crawler 202c are described above.

According to various embodiments, after collecting and indexing the relevant sources from the web (e.g., via the crawler 202c), a knowledge graph 229 may be generated by applying, by the tool 202a, the ensemble of algorithms 202b to the content acquired by the crawler 202c to identify and organize a set of semantically relevant topics or keywords from the acquired content. In various embodiments, the knowledge graph is a knowledge base that organizes information gathered from the various web sources to provide structured and detailed information regarding each of the user-entered one or more keywords. In some embodiments, after the tool 202a applies the ensemble of algorithms 202b, as described above, to the content acquired by the crawler 202c to generate the semantically relevant keywords scored by relevance, the knowledge graph may be built by the tool 202a based on the semantically relevant topics scored by relevance. In other words, the knowledge graph may be a representation and ranking of the semantically relevant topics or keywords. In some embodiments, the knowledge graph includes degrees of conceptual relevance to the initially-entered keywords, each of which serve as the seed terms from which the knowledge graph is built. For example, one of the input keywords is "keyword research," which may be placed at a first level (or seed level) of the knowledge graph. After applying the above-described algorithms to the content previously acquired by the crawler 202c, the tool 202a may be configured to populate lower levels of the knowledge graph branching out from the seed level. For example, if some topics or keywords are identified as having relatively high relevance, based on the acquired content, and as determined using the above-described algorithms, to the input keyword "keyword research," those highly relevant keywords may be placed closest to the seed term on the knowledge graph (e.g., at the second level of the knowledge graph, that is, one level beneath the seed keyword). The tool 202a may continue placing keywords at different levels of the knowledge graph based on the keywords' degree of relevance to the seed keyword. As such, a hierarchy of relevant keywords with respect to the input keywords may be built in the form of the knowledge graph. In some embodiments, the step of generating a knowledge graph may be optional, and the tool 202a may directly output the recommended keyword results to the user based on the results of application of the ensemble of algorithms to the acquired content, and skip the building of any knowledge graph.

According to various embodiments, based on the built knowledge graph, keyword suggestions may be served to the user by the tool 202a and displayed at the UI 210 via suggestions box 214. In other embodiments, the keyword suggestions are served based directly on the results of the tool's application of the ensemble of algorithms to the acquired content, rather than based on the knowledge graph. In some embodiments, the tool 202a outputs to the UI 210 all of the keywords of the knowledge graph. In other embodiments, the tool 202a may utilize relevancy thresholds in determining whether or not to output a keyword as a recommended keyword. For example, the tool 202a may include a predetermined relevancy threshold, and if a relevance score (as determined by the tool 202a) of a given keyword is below the relevancy threshold, then the tool 202a will not output that keyword as a suggested keyword. In some embodiments, the relevancy threshold corresponds to locations on the knowledge graph (e.g., the levels or tiers of the knowledge graph).

Figure 2C:
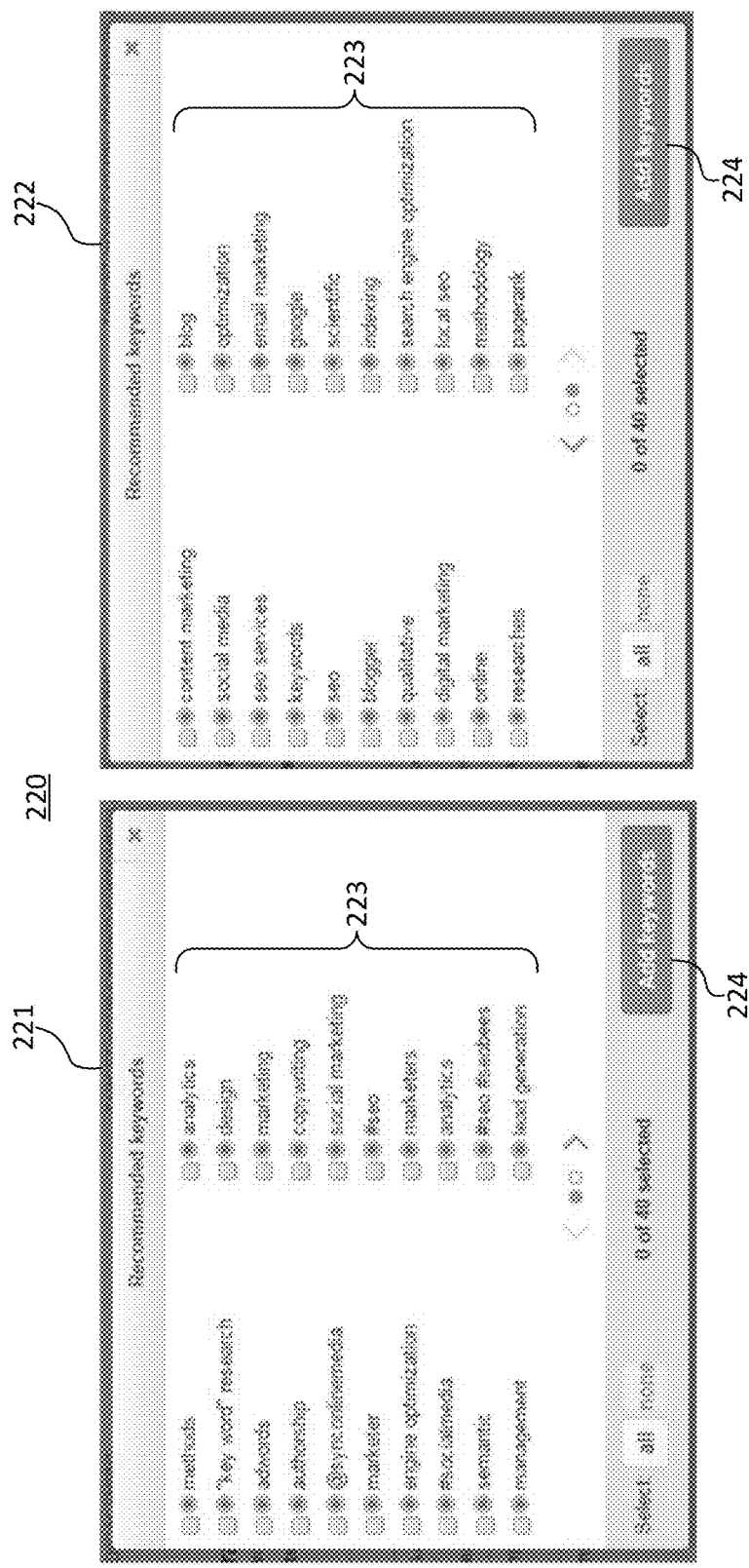
FIG. 2C is an embodiment of a screen shot of a recommended keywords page.

Referring to FIG. 2C, illustrated is an embodiment of a screen shot of a recommended keywords page 220. The recommended keywords page 220 may include a first page 221 and a second page 222. The recommended keywords page 220 may include a plurality of recommended keywords 223 that are generated and output by the topic tool 202a. As noted above, the suggestions box 214 may display a select few of the suggested keywords returned by the topic tool 202a. The keyword UI 210 may further provide the expanded recommended keywords list via the recommended keywords page 220. In some embodiments, the recommended keywords page 220 is accessed via the suggestions box 214 (e.g., by clicking on the suggestions box 214). In some embodiments, the list of recommended keywords 223 may be ranked in the order of their relevance, from more relevant to less relevant. The recommended keywords page 220 may further provide an add keyword interface 224 for allowing a user to add one or more of the recommended keywords 223 to the input field 213 or to their paid search keyword list. Accordingly, the recommended keywords 223 allow a user to supplement or replace the input keywords for purposes of paid searches and targeted social media advertising.

Figure 2D:
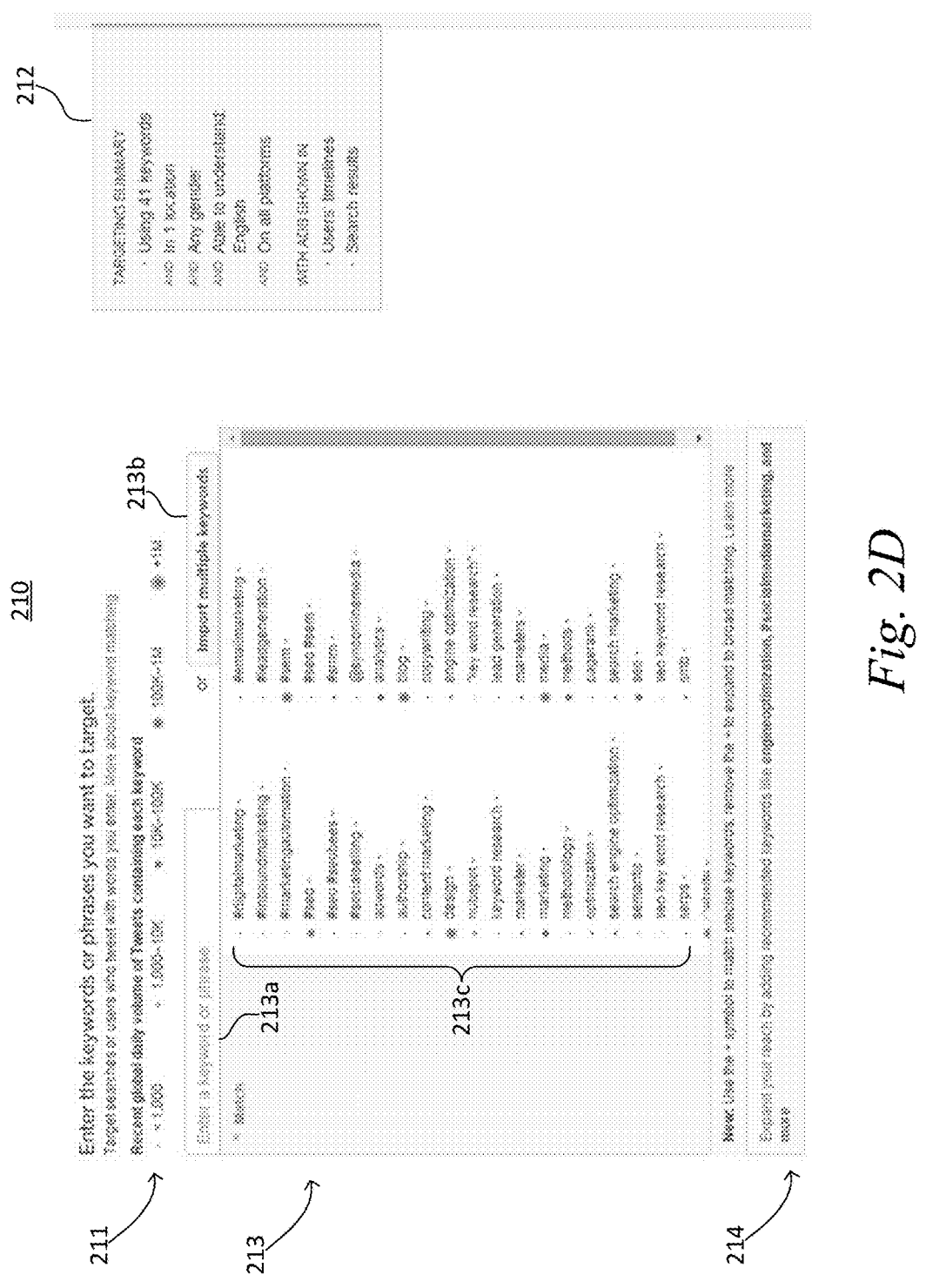

Referring to FIG. 2D, illustrated is another embodiment of a screen shot of a tool page. According to the embodiment shown in FIG. 2D, numerous keywords are entered into the input field 213, including "#digitalmarketing," "authorship," "adwords," etc. After these input keywords are entered, the topic tool 202a returns recommended keywords via the suggestions box 214. In the present embodiment, the recommended keywords include "engine optimization" and "#socialmediamarketing."

Figure 2E:
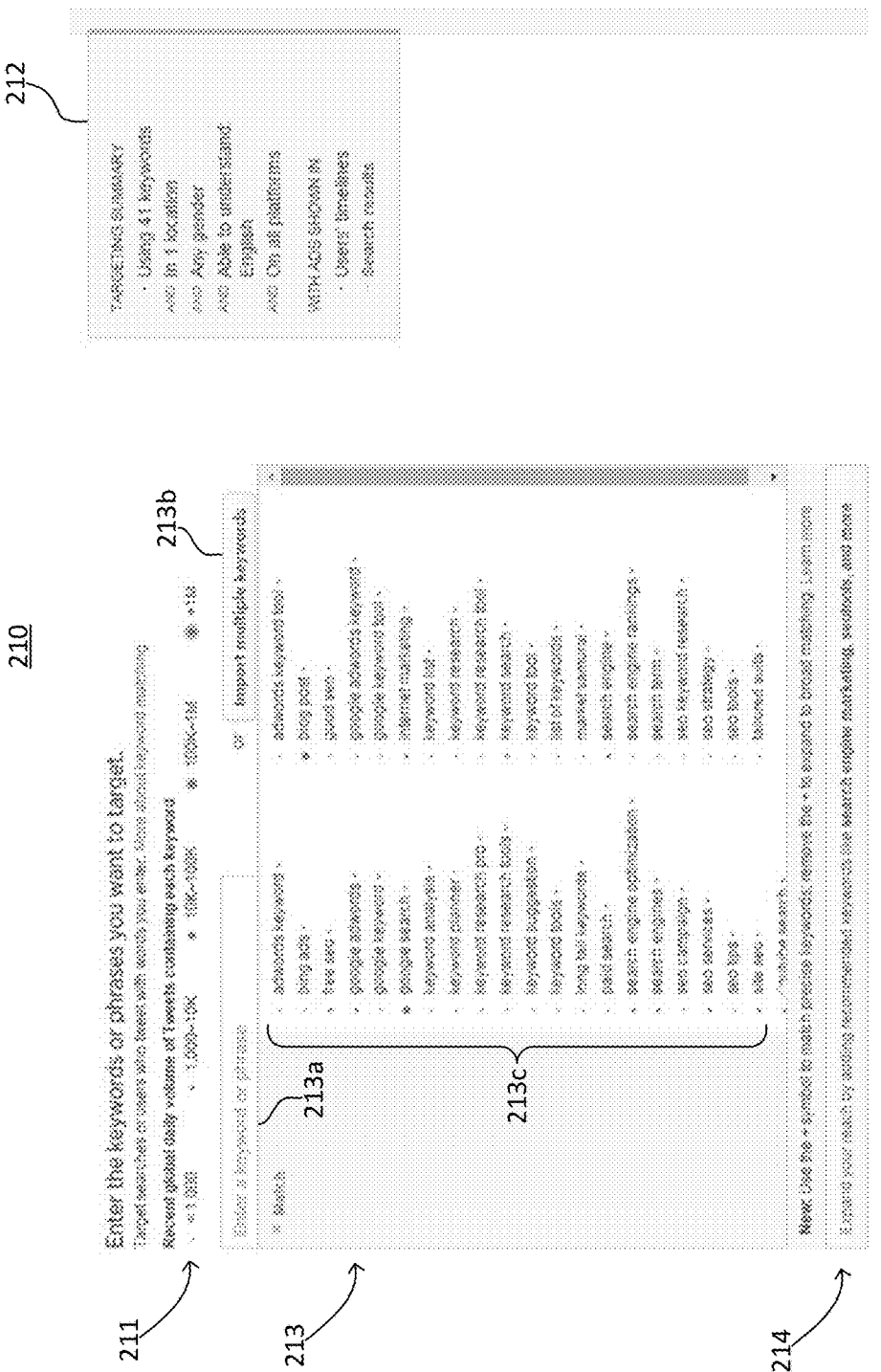
FIG. 2E is yet another embodiment of a screen shot of the tool page.

Referring to FIG. 2E, illustrated is yet another embodiment of a screen shot of a tool page. According to the embodiment shown in FIG. 2E, numerous keywords are entered into the input field 213, including "free seo," "paid search," "seo tools," etc. After these input keywords are entered, the topic tool 202a returns recommended keywords via the suggestions box 214. In the present embodiment, the recommended keywords include "search engine marketing" and "seotools."

Figure 3:
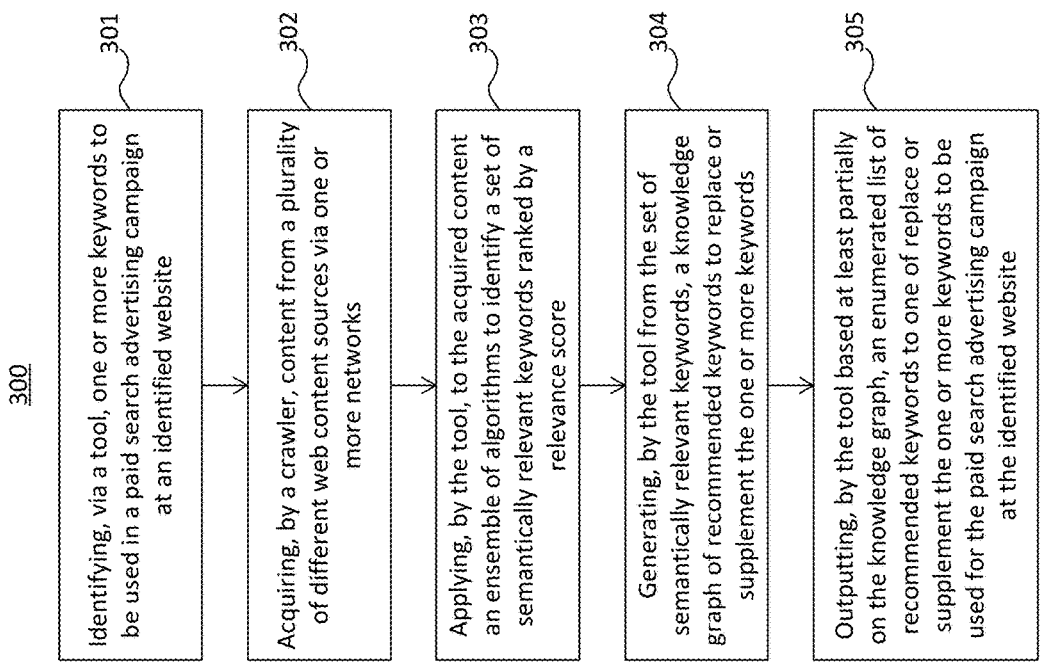
FIG. 3 is a flow diagram depicting an embodiment of a method of using the tool.

Referring to FIG. 3, a method 300 for generating from one or more keywords a list of recommended keywords for using in paid search advertising. At step 301, the method 300 includes identifying, via a tool, one or more keywords to be used in a paid search advertising campaign at an identified website. At step 302, the method 300 includes acquiring, by a crawler, content from a plurality of different web content sources via one or more networks. At step 303, the method 300 includes applying, by the tool, to the acquired content an ensemble of algorithms to identify a set of semantically relevant keywords ranked by a relevance score. At step 304, the method 300 includes generating, by the tool, from the set of semantically relevant keywords, a knowledge graph of recommended keywords to replace or supplement the one or more keywords. At step 305, the method 300 includes outputting, by the tool based at least partially on the knowledge graph, an enumerated list of recommended keywords to one of replace or supplement the one or more keywords to be used for the paid search advertising campaign at the identified website.

In some embodiments, step 301 may be performed by the tool 202a. In such embodiments, the tool 202a may receive the one or more keywords from a user interface at a client 102 and via the network 104. For example, the user interface may correspond to UI 210. The one or more keywords may be various words or phrases that a user wishes to acquire related keywords for.

In some embodiments, step 302 may be performed by the crawler 202c. In such embodiments, the crawler 202c may be configured to acquire content from various sources, such as, but not limited to, websites, blogs, articles, social networking sites, and/or the like. The acquired content may relate to the one or more keywords.

In some embodiments, step 303 may be performed by the tool 202a, which may receive the content acquired from the crawler 202ac In further embodiments, the tool 202a may access and work in conjunction with the ensemble algorithm 202b in applying the algorithms to the acquired content. In particular embodiments, the ensemble of algorithms 202b may include one or more key phrase extraction algorithms, one or more graph analyses algorithms, and one or more natural language processing algorithms.

In some embodiments, step 304 may be performed by the tool 202a after the tool 202a identifies the set of semantically relevant keywords ranked by relevance score. The ranking of the keywords may be embodied by the knowledge graph. In other embodiments, the generation of the knowledge graph is an optional step and may be skipped.

In some embodiments, step 305 may be performed by the tool 202a. In particular embodiments, the tool 202a may output the list of recommended keywords to the client 102 via the network 104. As such, the list of recommended keywords may be displayed at the UI at the client 102. The list of recommended keywords may be organized based on corresponding relevance scores associated with each recommended keyword.

In some embodiments, the recommended keywords may be incorporated into a paid search campaign such as by submission to a paid search tool or interface, such as Google AdWords for example. In some embodiments, the tool may be designed and constructed to facilitate the use of any one or more recommended keywords in paid advertising tool via any type and form of application programming interface to the paid advertising tool. In some embodiments, the user may use the recommended keyword list to manually configure the paid search campaign in the paid advertising tool. The user may use the systems and methods herein multiple times to replace and/or supplement keywords in the paid search campaign until the desired results or acceptable results are achieved.

While the invention has been particularly shown and described with reference to specific embodiments, it should be understood by those skilled in the art that various changes in form and detail may be made therein without departing from the spirit and scope of the invention described in this disclosure.

What is claimed is:

1. A method for generating from keywords recommended keywords for selecting content in search engine querying, the method comprising:
   (a) receiving, by a tool executing on a server having one or more processors, an input of one or more keywords for which to generate a list of recommended keywords to use via content selection in search engine queries at an identified website;
   (b) receiving, by the tool, one or more targeting attributes for targeting in the content selection in search engine queries at the identified website;
   (c) acquiring, by a crawler executing on the server, content from the identified website based at least in part on the one or more target attributes;
   (d) applying, by the tool, to the acquired content, an ensemble of algorithms, the ensemble comprising a predetermined sequence of:
      one or more key phrase extraction algorithms to generate a set of keywords based on at least the acquired content,
      one or more graph analyses algorithms to identify a set of topics semantically relevant to the set of keywords generated using the one or more key phrase extract algorithms, and
      one or more natural language processing algorithms to determine a relevance score for each topic of the set of semantically relevant keywords identified using the one or more graph analyses algorithm, the relevance score indicating semantic relevance of the topic to the input of the one of more keywords;
   (e) generating, by the tool from the set of semantically relevant keywords, a knowledge graph of recommended keywords for the input one of more keywords ranked by at least the relevance scores; and
   (f) outputting, by the tool based at least partially on the knowledge graph, an enumerated list of recommended keywords to use in the content selection in search engine queries at the identified website based at least in part on the one or more targeting attributes.

2. The method of claim 1, wherein (b) further comprises receiving, by the tool, one or more targeting attributes identifying a volume of content at the identified website for which to target.

3. The method of claim 1, wherein (b) further comprises receiving, by the tool, one or more targeting attributes identifying a timeline of content at the identified website for which to target.

4. The method of claim 1, wherein (b) further comprises receiving, by the tool, one or more targeting attributes identifying one or more of a gender, language or location of a user for which to target.

5. The method of claim 1, wherein (c) further comprise acquiring, by the crawler, additional content from the plurality of different web content sources comprising web sites, news articles, blog posts and keyword data.

6. The method of claim 5, wherein (d) further comprises applying, by the tool, the ensemble to both the acquired content and the additional content.

7. The method of claim 1, wherein (f) further comprising outputting, by the tool, the enumerated list of recommend keywords ranked by at least one of an attractiveness score, a volume score and a competition score.

8. The method of claim 1, wherein (f) further comprising outputting, by the tool, the enumerated list of recommend keywords ranked by at least a relevance score.

9. The method of claim 1, wherein (f) further comprising outputting, by the tool, the enumerated list of recommend keywords ranked by a cost-per-click value.

10. The method of claim 1, wherein the one or more key phrase extraction algorithms comprise a Bayesian statistical ensemble and the ensemble performs a plurality of term ranking functions are performed including one or more of the following: a core phrase term ranking function, a tail phrase term ranking function, a hyperdictionary graph traversal algorithm and a semantic knowledgebase path traversal score.

11. A system for generating from keywords a list of recommended keywords for selecting content in search engine querying, the system comprising:
   a tool executable on a server having one or more processors, configured to:
      receive an input of one or more keywords for which to generate a list of recommended keywords to use via content selection in search engine queries at an identified website and one or more targeting attributes for targeting at the identified website;
a crawler executable on the server, configured to acquire content from the identified website based at least in part on the one or more target attributes;
wherein the tool is further configured to:
apply to the acquired content an ensemble of algorithms, the ensemble comprising a predetermined sequence of:
one or more key phrase extraction algorithms to generate a set of keywords based on at least the acquired content,
one or more graph analyses algorithms to identify a set of topics semantically relevant to the set of keywords generated using the one or more key phrase extract algorithms, and
one or more natural language processing algorithms to determine a relevance score for each topic of the set of semantically relevant keywords identified using the one or more graph analyses algorithm, the relevance score indicating semantic relevance of the topic to the input of the one of more keywords;
generate from the set of semantically relevant keywords, a knowledge graph of recommended keywords for the input one of more keywords ranked by at least the relevance scores; and
output, based at least partially on the knowledge graph, an enumerated list of recommended keywords to use for content selection in search engine queries at the identified website based at least in part on the one or more targeting attributes.

12. The system of claim 11, wherein the one or more targeting attributes identify a volume of content at the identified website for which to target.

13. The system of claim 11, wherein the one or more targeting attributes identify a timeline of content at the identified website for which to target.

14. The system of claim 11, wherein the one or more targeting attributes identify one or more of a gender, language or location of a user for which to target.

15. The system of claim 11, wherein the crawler is further configured to acquire additional content from the plurality of different web content sources comprising web sites, news articles, blog posts and keyword data.

16. The system of claim 15, wherein the tool is further configured to apply the ensemble to both the acquired content and the additional content.

17. The system of claim 11, wherein the tool is further configured to output the enumerated list of recommend keywords ranked by at least one of an attractiveness score, a volume score and a competition score.

18. The system of claim 11, wherein the tool is further configured to output the enumerated list of recommend keywords ranked by at least a relevance score.

19. The system of claim 11, wherein the tool is further configured to output the enumerated list of recommend keywords ranked by a cost-per-click value.

20. The system of claim 11, wherein the one or more key phrase extraction algorithms comprise a Bayesian statistical ensemble and the ensemble is further configured to perform a plurality of term ranking functions are performed including one or more of the following: a core phrase term ranking function, a tail phrase term ranking function, a hyperdictionary graph traversal algorithm and a semantic knowledge-base path traversal score.

* * * * *